United States Patent
Mahadevan et al.

(10) Patent No.: US 10,696,480 B2
(45) Date of Patent: Jun. 30, 2020

(54) STORAGE MODULE CONFIGURED TO ACCELERATE TRANSITION OF INVENTORY CARRIERS BETWEEN UPPER AND LOWER TRACKS

(71) Applicant: Amazon Technologies, Inc., Seattle, WA (US)

(72) Inventors: Dinesh Mahadevan, Lynnwood, WA (US); Martin Peter Aalund, Seattle, WA (US); Jon Stuart Battles, North Bend, WA (US); Jon David DeFant, Seattle, WA (US); Benjamin Douglas Garcia, Seattle, WA (US); Vahideh Kamranzadeh, Seattle, WA (US); George T. Davies, Brigham City, UT (US); Steven Eric Nuetzman, Syracuse, UT (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 15/656,552

(22) Filed: Jul. 21, 2017

(65) Prior Publication Data
US 2019/0023489 A1 Jan. 24, 2019

(51) Int. Cl.
*B65G 1/04* (2006.01)
*B65G 1/133* (2006.01)
(Continued)

(52) U.S. Cl.
CPC ............... *B65G 1/133* (2013.01); *B25J 5/02* (2013.01); *B25J 9/0027* (2013.01); *B25J 9/0093* (2013.01);
(Continued)

(58) Field of Classification Search
CPC ..................................................... B65G 1/045
See application file for complete search history.

(56) References Cited

U.S. PATENT DOCUMENTS

| 1,905,924 A | 4/1933 | MacLauchlan |
| 2,999,579 A | 9/1961 | Kostrzewa |
(Continued)

FOREIGN PATENT DOCUMENTS

| DE | 2013005 A1 | 9/1971 |
| DE | 2552914 A1 | 6/1976 |
(Continued)

OTHER PUBLICATIONS

International Patent Application No. PCT/US2018/013922; Int'l Search Report and the Written Opinion; dated Jun. 21, 2018; 16 pages.
(Continued)

*Primary Examiner* — Saul Rodriguez
*Assistant Examiner* — Willie Berry, Jr.
(74) *Attorney, Agent, or Firm* — BakerHostetler

(57) ABSTRACT

In one embodiment, an storage module has first and second guide rails that are spaced from one another along a lateral direction. Each guiderail has an upper track and a lower track spaced from one another along a vertical direction, and first and second connecting tracks that connect the upper track to the lower track at first and second ends, respectively. A plurality of inventory carriers that are supported between the guiderails and are arranged end-to-end along the upper and lower tracks. A drivetrain drives the carriers to translate along the upper and lower tracks at a first speed, and drives the carriers to translate along the connecting tracks at a second speed, faster than the first speed. Increasing the speed of the carriers at the connecting tracks can prevent the carriers from colliding with one another when transitioning between the upper track and the lower track.

17 Claims, 6 Drawing Sheets

(51) Int. Cl.
*B25J 9/00* (2006.01)
*B25J 5/02* (2006.01)
*B25J 9/02* (2006.01)
*B25J 9/04* (2006.01)
*B25J 9/06* (2006.01)
*B25J 9/16* (2006.01)

(52) U.S. Cl.
CPC .............. *B25J 9/023* (2013.01); *B25J 9/041* (2013.01); *B25J 9/045* (2013.01); *B25J 9/06* (2013.01); *B25J 9/1612* (2013.01); *B25J 9/1623* (2013.01); *B25J 9/1697* (2013.01); *B65G 1/0485* (2013.01)

(56) References Cited

U.S. PATENT DOCUMENTS

| | | | |
|---|---|---|---|
| 3,184,030 A | 5/1965 | Herbert | |
| 3,809,208 A | 5/1974 | Shields | |
| 3,904,022 A | 9/1975 | Lutz | |
| 4,093,086 A | 6/1978 | Lucas et al. | |
| 4,346,803 A | 8/1982 | Haessler et al. | |
| 4,372,723 A | 2/1983 | De Coene et al. | |
| 4,378,873 A | 4/1983 | Cloudy | |
| 4,465,417 A | 8/1984 | Baumann et al. | |
| 4,645,058 A | 2/1987 | Meyn | |
| 4,934,507 A | 6/1990 | Blocker | |
| 4,972,937 A | 11/1990 | Aarts | |
| 5,387,064 A | 2/1995 | Cardinal | |
| 5,465,827 A | 11/1995 | Nakagawa et al. | |
| 5,472,309 A | 12/1995 | Bernard, II et al. | |
| 5,707,199 A | 1/1998 | Faller | |
| 6,059,229 A | 5/2000 | Luria | |
| 6,098,786 A | 8/2000 | Brumm et al. | |
| 6,336,549 B1 | 1/2002 | Jen | |
| 6,626,282 B1 | 9/2003 | Nishizawa et al. | |
| 6,752,583 B2 | 6/2004 | Rajewski | |
| 6,784,391 B2 | 8/2004 | Takizawa | |
| 6,814,214 B2 * | 11/2004 | Warlow | B65D 19/08 198/300 |
| 6,814,221 B2 | 11/2004 | Goussev | |
| 7,090,068 B2 | 8/2006 | Matsuo | |
| 7,381,022 B1 | 6/2008 | King | |
| 7,637,367 B1 | 12/2009 | Cannell | |
| 7,798,305 B2 | 9/2010 | Camelli | |
| 8,308,418 B2 | 11/2012 | Ma et al. | |
| 8,807,320 B2 | 8/2014 | Fortenbery et al. | |
| 8,882,433 B2 | 11/2014 | Bonora et al. | |
| 8,939,296 B2 | 1/2015 | Weyler et al. | |
| 8,972,045 B1 | 3/2015 | Mountz et al. | |
| 9,028,613 B2 | 5/2015 | Kim et al. | |
| 9,139,363 B2 | 9/2015 | Lert | |
| 9,434,558 B2 | 9/2016 | Criswell | |
| 9,520,012 B2 | 12/2016 | Stiernagle | |
| 9,550,626 B2 | 1/2017 | Parodi et al. | |
| 9,718,625 B2 | 8/2017 | Huang | |
| 9,796,527 B1 | 10/2017 | Kaukl et al. | |
| 2008/0093313 A1 | 4/2008 | Huber | |
| 2008/0298943 A1 * | 12/2008 | Siegel | B65G 1/127 414/567 |
| 2010/0316468 A1 | 12/2010 | Lert et al. | |
| 2011/0313811 A1 | 12/2011 | Urban et al. | |
| 2012/0118699 A1 | 5/2012 | Buchmann et al. | |
| 2015/0175354 A1 | 6/2015 | Kharkover | |
| 2015/0178673 A1 | 6/2015 | Penneman | |
| 2015/0352721 A1 | 12/2015 | Wicks et al. | |
| 2015/0360865 A1 | 12/2015 | Massey | |
| 2016/0075512 A1 | 3/2016 | Lert, Jr. | |
| 2016/0178033 A1 * | 6/2016 | Chung | F16H 3/62 475/269 |
| 2016/0214796 A1 | 7/2016 | Stefani et al. | |
| 2017/0036859 A1 | 2/2017 | Lopes | |
| 2017/0107056 A1 | 4/2017 | Kadaba et al. | |
| 2017/0225890 A1 | 8/2017 | Li | |
| 2018/0037410 A1 | 2/2018 | DeWitt | |
| 2018/0201445 A1 | 7/2018 | Battles et al. | |
| 2018/0215534 A1 | 8/2018 | Munholland | |

FOREIGN PATENT DOCUMENTS

| | | |
|---|---|---|
| DE | 3941754 A1 | 6/1991 |
| DE | 102013008872 A1 | 11/2014 |
| FR | 2292646 A1 | 6/1976 |
| GB | 1516120 A | 6/1978 |
| JP | S54-031175 A | 3/1979 |
| JP | 61-114907 A | 6/1986 |
| JP | H01-162611 A | 6/1989 |
| JP | H05-294181 A | 11/1993 |
| JP | H05-294412 A | 11/1993 |
| JP | H05-319517 A | 12/1993 |
| WO | WO 2002/074663 A1 | 9/2002 |
| WO | WO 2007/036250 A1 | 4/2007 |
| WO | WO 2014/092145 A1 | 6/2014 |
| WO | WO 2015/147033 A1 | 10/2015 |

OTHER PUBLICATIONS

International Patent Application No. PCT/US2018/013920; Int'l Search Report and the Written Opinion; dated Jun. 21, 2018; 16 pages.
U.S. Appl. No. 15/408,128, filed Jan. 17, 2017, Battles et al.
U.S. Appl. No. 15/408,207, filed Jan. 17, 2017, Battles et al.
U.S. Appl. No. 15/408,182, filed Jan. 17, 2017, Battles et al.
U.S. Appl. No. 15/797,562, filed Oct. 30, 2017, Kalm et al.
U.S. Appl. No. 15/721,280, filed Sep. 29, 2017, Kalm et al.
"Vertical Lift Modules—Shuttle XP Family Flexible Storage Solutions in a Compact Footprint"; http://www.kardexremstar.com/us/materials-handling-storage-solutions/vertical-lift-modules.html; kardexremstar; accessed Mar. 16, 2018; 8 pages.
"Modular Diamond Phoenix Horizontal Carousels"; https://www.modula.us/products/modula-diamond-phoenix-horizontal-carousels.html; Modula HC; accessed Mar. 16, 2018; 6 pages.
"Robots are AutoStore's iconic laborers"; http://www.autostoresystem.com/Products/Robot; AutoStore; accessed Mar. 19, 2018; 5 pages.
"3D-Matrix Solution"; https://www.ssi-schaefer.com/en-us/products/order-picking/automated-order-picking/3d-matrix-solution--53844; SSI Schafer; accessed Mar. 19, 2018; 4 pages.
"Dematic Multishuttle 2"; http://www.dematic.com/en-us/supply-chain-solutions/by-technology/storage-systems/dematic-multishuttle-2/; Dematic; accessed Mar. 19, 2018; 6 pages.
"AS/RS Solutions"; https://www.intelligrated.com/solutions/asrs-solutions; Honeywell Integrated; © 2018; accessed Mar. 19, 2018; 2 pages.
"AS/RS Systems for Distribution & Manufacturing"; http://www.cisco-eagle.com/material-handling-systems/asrs-systems; Cisco-Eagle; © 2018; accessed Mar. 19, 2018; 6 pages.
"Power Automation Systems—PowerStor Deep Lane ASRS"; https://www.youtube.com/watch?v=zJOAVOWluro; Power Automation Systems; Sep. 2011; accessed Mar. 19, 2018; 2 pages.
"AutoStore Logistic—Technical presentation"; https://www.youtube.com/watch?v=iyVDMp2bL9c; Aug. 2009; accessed Mar. 19, 2018; 3 pages.
"Scalable multi-level shuttle Navette at Karl Storz: A future-proof investments"; https://www.youtube.com/watch?v=jEyqkQFp1Uw; SSI Schafer; Jun. 2016; accessed Mar. 19, 2018; 2 pages.
"Automated Vertical Carousels"; https://www.youtube.com/watch?v=5STR9jKABxQ; Cisco-Eagle; Dec. 2015; accessed Mar. 19, 2018; 2 pages.

* cited by examiner

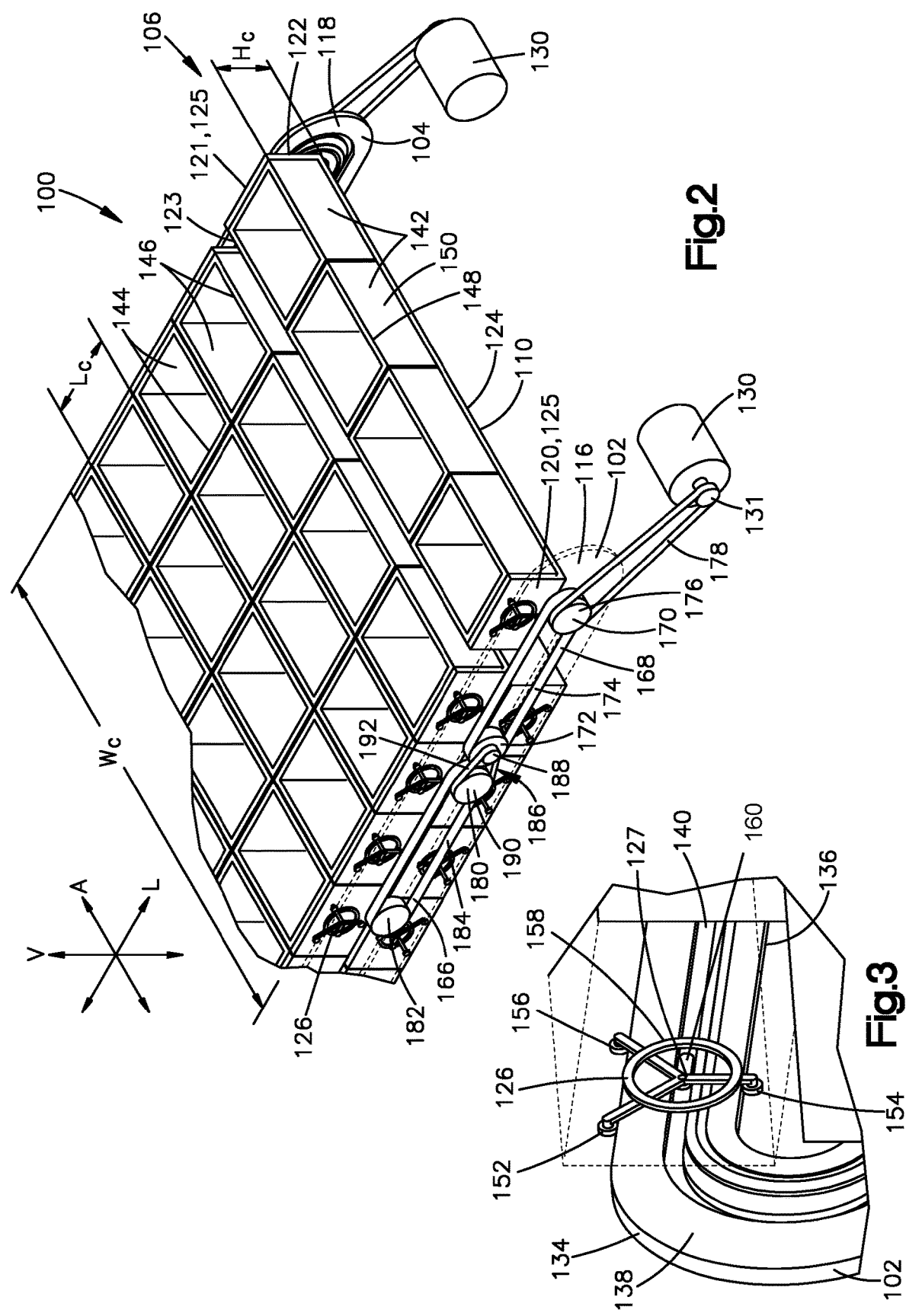

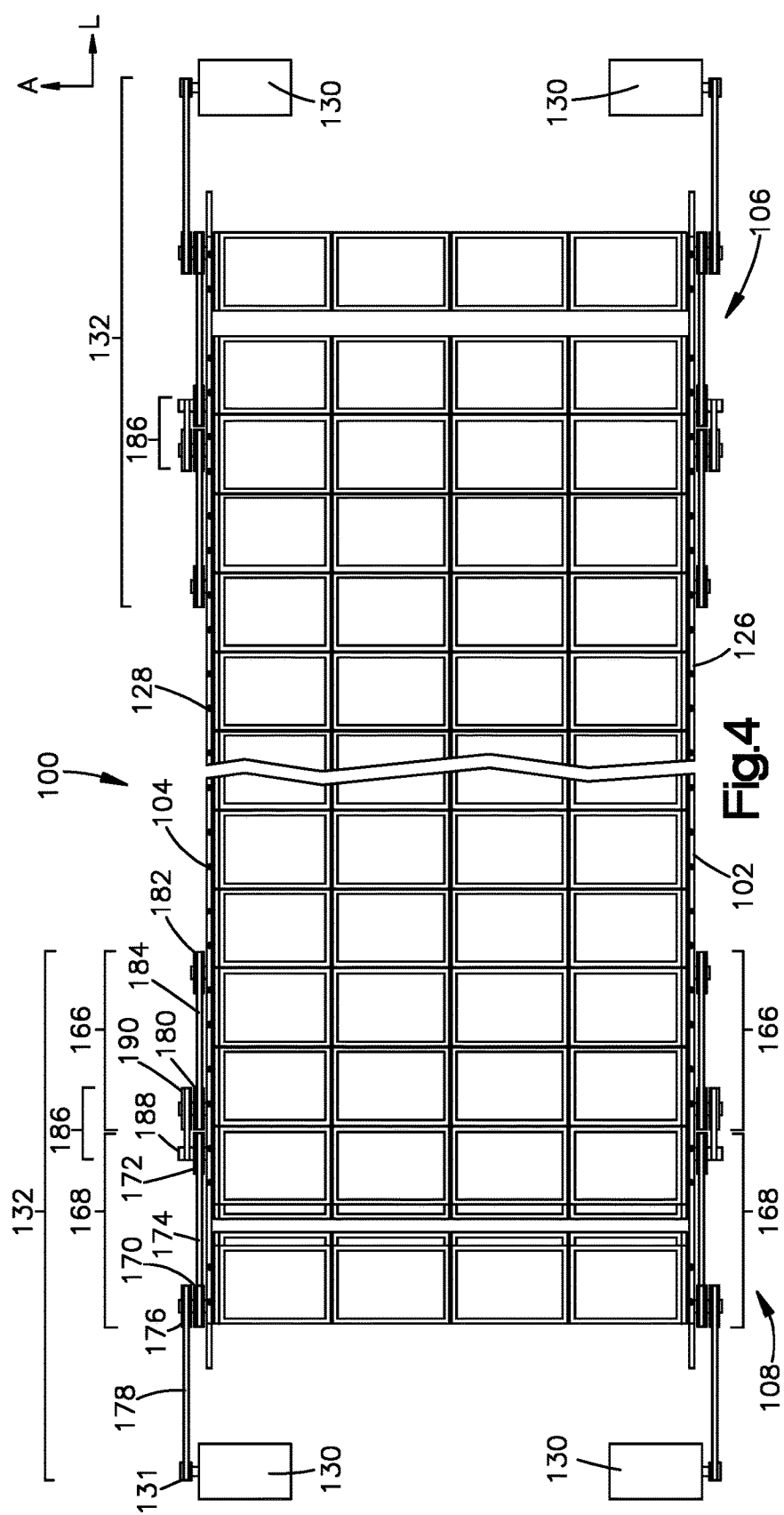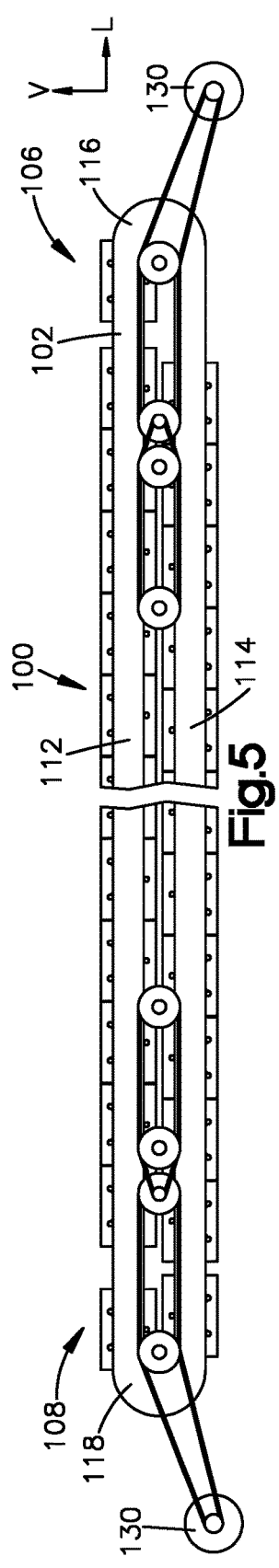

STORAGE MODULE CONFIGURED TO ACCELERATE TRANSITION OF INVENTORY CARRIERS BETWEEN UPPER AND LOWER TRACKS

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, a human can carry the inventory item down an aisle in the warehouse to the desired shelving unit and place the inventory item on the desired shelving unit where it is stored until it is needed. When an order is placed, a human can travel down the aisle to the desired shelving unit, retrieve the inventory item from the desired shelving unit, and place the inventory item on a conveyor belt that carries the inventory item downstream for packaging and shipping. There are some systems in which containers are oriented in rows, and the entire row moves up or down vertically under the control of an operator.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 2 shows an enlarged perspective view of one end of the storage module of FIG. 1;

FIG. 3 shows an enlarged perspective view of an inside of a guiderail at the end of FIG. 2;

FIG. 4 shows a top plan view of the storage module of FIG. 1;

FIG. 5 shows a side elevation view of the storage module of FIG. 1;

DETAILED DESCRIPTION

Figure 1:
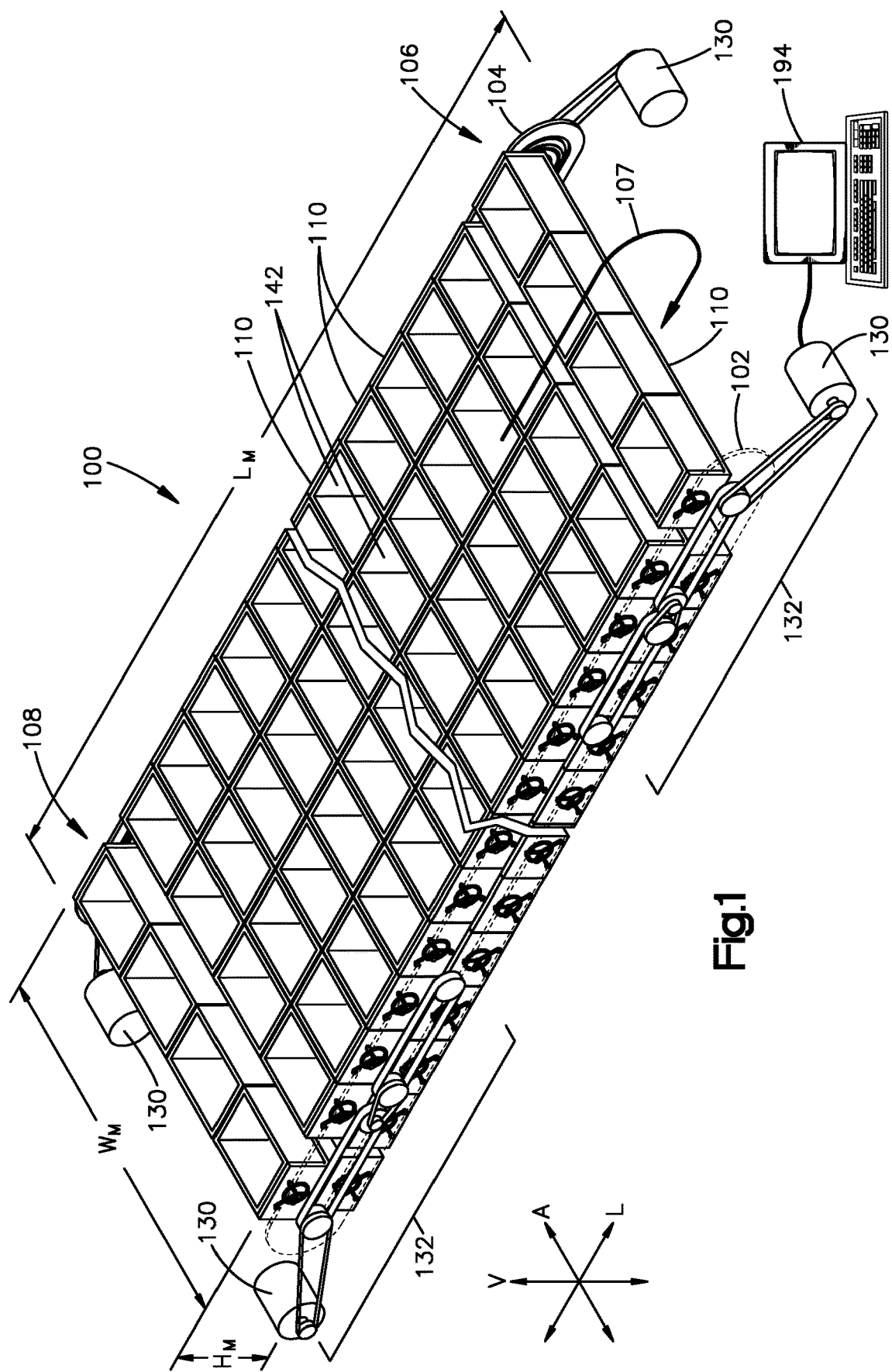
FIG. 1 shows a perspective view of a storage module according to one embodiment.

In inventory storage facilities, storage density is an important characteristic. Packing inventory items closer together reduces the overall volume that is needed to store the inventory items. Thus, a smaller building or structure can be used to store inventory items that are packed closer together. Alternatively, in an existing storage facility, increasing density can free up warehouse space that can be used to store additional inventory items, thereby increasing the capacity of the storage facility. Presented herein are inventory storage modules, and storage systems that can have a higher storage density than the conventional shelving units discussed above.

Referring to FIGS. 1 to 5, an inventory storage module 100 according to one embodiment is shown that is configured to store inventory items. In general, the storage module 100 has a first end 106 and a second end 108 spaced from one another along a longitudinal direction L, such that the storage module 100 is elongate along the longitudinal direction L. The storage module 100 comprises a first guiderail 102 and a second guiderail 104 that are spaced from one another along a lateral direction A. The first and second guiderails 102 and 104 can be substantially mirror images of one another. The first and second guiderails 102 and 104 define first and second loops, respectively, where each loop is defined in a plane that extends in the longitudinal direction L and a vertical direction V, where the longitudinal, lateral, and vertical directions are perpendicular to one another. Thus, the storage module 100 defines a path that forms a loop 107 in a plane that extends in the longitudinal direction L and the vertical direction V.

Each guiderail 102 and 104 has an upper track 112 and a lower track 114 spaced from one another along the vertical direction V. Further, each guiderail 102 and 104 has a first connecting track 116 that connects the upper track 112 to the lower track 114 at the first end 106, and a second connecting track 118 that connects the upper track 112 to the lower track 114 at the second end 108. The first and second connecting tracks 116 and 118 can curve away one another as they extend from each of the upper and lower tracks 112 and 114. For example, each of the first and second connecting tracks 116 and 118 can define a u-shape, where the first and second connecting tracks 116 and 118 extend away from one another to the respective bottoms of their u-shapes.

The storage module 100 also has a plurality of inventory carriers 110, each supported by both the first and second guiderails 102 and 104. Each inventory carrier 110 can be similar to a moving shelf. Each inventory carrier 110 has a first carrier side 120 and a second carrier side 121 spaced from one another along the lateral direction A. Each inventory carrier 110 has a first carrier end 122 and a second carrier end 123 spaced from one another along the longitudinal direction L. Further, each inventory carrier 110 has a carrier bottom 124 that extends between the first and second carrier sides 120 and 121 and extends between the first and second carrier ends 122 and 123.

For each inventory carrier 110, the storage module 100 has a first wheel assembly 126 that is configured to couple the first carrier side 120 of the inventory carrier 110 to the first guiderail 102 such that the first carrier side 120 is transportable around the loop defined by the first guiderail 102. Similarly, for each inventory carrier 110, the storage module 100 has a second wheel assembly 128 that is configured to couple the second carrier side 121 of the inventory carrier 110 to the second guiderail 104 such that the second carrier side 121 is translatable around the loop defined by the second guiderail 104. Preferably, in a horizontal portion of guiderails 102 and 104, the wheel assemblies 126 are supported by the guiderails and roll along them.

The inventory carriers 110 are densely packed along the upper and lower tracks 112 and 114. For example, the inventory carriers 110 along the upper track 112 are arranged end-to-end such that there is little to no space between adjacent ones of the inventory carriers 110 on the upper track 112. Similarly, the inventory carriers 110 along the lower track 114 are arranged end-to-end such that there is little to no space between adjacent ones of the inventory carriers 110 on the lower track 114. In some embodiments, inventory carriers 110 along each track may contact one another other. In other embodiments, inventory carriers 110 may be spaced from each other along each track by a distance that is no more than 10 percent of the length of each inventory carrier 110 along the track, such as no more than 10 percent of the length of each inventory carrier 110 along the track or no more than 5 percent of the length of each inventory carrier 110 along the track.

Space between inventory carriers 110 on the upper track 112 and inventory carriers 110 on the lower track 114 may optionally be minimized to maximize storage density. In some examples, spacing between inventory carriers 110 on the upper track 112 and inventory carriers 110 on the lower track 114 may be described by absolute distance, such as a distance ranging from 0.25 to 1.25 inches, such as 0.50 to 1.00 inches. In other examples, spacing between inventory carriers 110 on the upper track 112 and inventory carriers 110 on the lower track 114 may be described in relation to a height of one of the inventory carriers, such as a spacing that is no more than 20 percent of the height of the inventory carrier, such as no more than 15 percent of the height of the inventory carrier, such as no more than 10 percent of the height of the inventory carrier, no more than 5 percent of the height of the inventory carrier. Storage density is directly related to the distance between inventory carriers 110. Thus, as the distance from the inventory carriers 110 on the upper track 112 to the inventory carriers 110 on the lower track 114 is decreased, the storage density increases. However, if the distance between the inventory carriers 110 on the upper track 112 and the inventory carriers 110 on the lower track 114 is too small, then the inventory carriers 110 might not freely rotate between the upper and lower tracks without colliding. To prevent collisions, the horizontal spacing between inventory carriers 110 can be increased through acceleration as each inventory carrier 110 approaches an end 106 or 108. Thus, the density of the inventory carriers 110 can be lower at the first and second connecting tracks 116 and 118 compared to the density at the upper and lower tracks 112 and 114 as will be described in further detail below.

The storage module 100 has at least one motor 130 and at least one drivetrain 132 that drives the inventory carriers 110 to translate around the first and second loops in response to a control signal until a desired one of the inventory carriers 110 is presented at one of the first end 106 and the second end 108. At such position, the desired inventory carrier 110 can be accessed by a person or machine such as a robotic arm so that an inventory item can then be placed onto the desired inventory carrier 110 for storage or can be removed from the desired inventory carrier 110 to fulfill a customer order or for further transporting or processing. In some embodiments, the motor 130 and drivetrain 132 can operate in a unidirectional manner such the inventory carriers 110 can be moved in only a first direction (that is, clockwise or counterclockwise) around the loop of the respective first guiderail 102 or second guiderail 102. Alternatively, the at least one motor 130 and at least one drivetrain 132 can operate in a bidirectional manner such the inventory carriers 110 can be selectively rotated in one of the first direction and a second direction, opposite the first direction.

The details of the example embodiment in FIGS. 1 to 5 will now be described in further detail. It will be noted that at least one, up to all of, the guiderails 102 and 104, the inventory carriers 110, the wheel assemblies 126 and 128, the motor 130 and drivetrain 132 can be implemented in any other suitable manner. For example, the guiderails 102 and 104, the inventory carriers 110, and the wheel assemblies 126 and 128 can be implemented in a manner similar to that of U.S. patent application Ser. Nos. 15/408,182, 15/408,128, and 15/408,207, each filed on Jan. 17, 2017, the teachings of all of which are hereby incorporated by reference as if set forth in their entirety therein.

As shown in FIG. 3, each guiderail 102 and 104 has an outer guiderail surface 134 that defines an outer perimeter of the respective guiderail 102 or 104 and an inner guiderail surface 136 that defines an inner perimeter of the respective guiderail 102 or 104. The inner guiderail surface 136 is spaced inward of the outer guiderail surface 134 such that the outer guiderail surface 134 surrounds the inner guiderail surface 136. The outer and inner guiderail surfaces 134 and 136 can face away from one another. Each guiderail 102 and 104 has a guide-rail body 138 that extends between the outer guiderail surface 134 and the inner guiderail surface 136. Each guide-rail body 138 can be oriented in a plane that extends along the vertical and longitudinal directions. Further, each guide-rail body 138 can define a guide-rail channel 140 that extends into the guide-rail body 138 between the outer and inner guiderail surfaces 134 and 136 so as to define a closed loop that is configured to receive a portion of one of the wheel assemblies 126 and 128 as described further below.

Referring to FIG. 2, each inventory carrier 110 can be sized to support at least one storage container 142. In some embodiments, each inventory carrier 110 can be elongate along the lateral direction A such that each inventory carrier 110 is configured to carry a plurality of storage containers 142. For example, each inventory carrier 110 can have an overall carrier width $W_C$ along the lateral direction A, an overall carrier length $L_C$ along the longitudinal direction L, and an overall carrier height $H_C$ along the vertical direction V. The overall carrier width $W_C$ can be greater than the overall carrier length $L_C$ such that each inventory carrier 110 is elongate along the lateral direction A. Thus, each inventory carrier 110 can support the plurality of storage containers 142 such that the storage containers are in a side-by-side relation. Supporting a plurality of storage containers 142 in side-by-side relation between the pair of guiderails 102 and 104 can result in a higher storage density than a comparable system in which only one storage container 142 is supported between the pair of guiderails 102 and 104.

Each inventory carrier 110 can have opposed carrier sidewalls 125 that are spaced from one another along the lateral direction A. The carrier bottom 124 can extend between the carrier sidewalls 125. The carrier bottom 124 can support the storage containers 142 between the carrier sidewalls 125. In some embodiments, each inventory carrier 110 can define a shelf that supports a plurality of storage containers 142.

Each storage container 142 can be any suitable storage container configured to be supported by a carrier bottom 123 of an inventory carrier 110 and to hold items. For example, each storage container 142 can be a rectangular structure, such as a bin, formed from a rigid material such as high-density plastic, wood, aluminum, or other suitable material. Each storage container can have a pair of opposed sidewalls 144 that are spaced from one another along the lateral direction A. Each storage container can have a pair of opposed end walls 146 that are spaced from one another along the longitudinal direction L. Each storage container 142 can further an upper end 148 and a bottom surface 150 spaced from one another along the vertical direction V. The bottom surface 150 can extend between the opposed sidewalls 144 and between the opposed end walls 146. The upper end 148 can be open for ease of access in placing inventory items into, and retrieving inventory items from, the storage container 142. Each storage container 142 can have an overall width $W_S$ along the lateral direction A, an overall height $H_S$ along the vertical direction V, and an overall length $L_S$ along the longitudinal direction L. In some embodiments, the overall width $W_S$ can be greater than the overall length $L_S$ and overall height $H_S$. When a plurality of storage containers 142 are supported by an inventory carrier 110 in a side-by-side relation, each storage container 142 can have at least one sidewall 144 that faces a sidewall 144 of an adjacent storage container 142.

Referring to FIG. 3, each wheel assembly 126 and 128 includes an outer wheel 152, an inner wheel 154, and a rotating coupler 158 that couples the outer and inner wheels 152 and 154 to one of the container end walls 146 of a respective one of the inventory containers 110. The outer wheel 152 can be offset from the inner wheel 154 with respect to an outward direction. The rotating coupler 158 supports the outer wheel 152 such that the outer wheel 152 translates along the outer guiderail surface 134 of a respective one of the guiderails 102 and 104. Similarly, the rotating coupler 158 supports the inner wheel 154 such that the inner wheel 154 translates along the inner guiderail surface 136 of the respective one of the guiderails 102 and 104. The rotating coupler 158 rotates with respect to the respective inventory carrier 110 as the inventory carrier 110 transitions from an upper track 112 to a lower track 114 (as can be seen in FIG. 2). As the rotating coupler 158 rotates, the outer wheel 152 remains in contact with the outer guiderail surface 134 of a respective one of the guiderails 102 and 104, and the inner wheel 154 remains in contact with the inner guiderail surface 136 of the respective one of the guiderails 102 and 104. Further, as the rotating coupler 158 rotates, the respective inventory carrier 110 remains upright without rotating. Thus, as each inventory carrier 110 transitions from an upper track 112 to a lower track 114, the upper end 148 of each storage container 142 that is supported by the inventory carrier 110 remains disposed above the bottom surface 150 of the storage container 142 to prevent the contents of the storage container 142 from spilling.

Each wheel assembly 126 and 128 can optionally include a third wheel 156, and the rotating coupler 158 can couple the third wheel 156 to the respective container end wall 146. The third wheel 156 can be an outer wheel that translates along the respective outer guiderail surface 134. Further, the third wheel 156 can be offset from the inner wheel 154 with respect to an outward direction, and can be offset from the outer wheel 152 with respect to a direction that is perpendicular to the outward direction. Thus, the outer wheel 152, the third wheel 156, and the inner wheel 154 can be spaced from one another such that the inner wheel 154 forms the bottom of a y-shape, and the outer wheel 152 and third wheel 156 form the top of a y-shape. Each wheel assembly 126 and 128 can further include a y-shaped bracket 127 that supports the outer wheel 152, the third wheel 156, and the inner wheel 154. In some alternative embodiments, the third wheel 156 can be an inner wheel that translates along the respective inner guiderail surface 136. In other alternative embodiments, each wheel assembly 126 and 128 can include as few as a one wheel that is guided within a guiderail between inner and outer surfaces of the guiderail, or can have any suitable number of wheels greater than one.

Each wheel assembly 126 and 128 can include a guide 160 that is received in the guide-rail channel 140, and translates around the guide-rail channel 140. Each guide 160 maintains its respective inventory carrier 110 in an upright position so as to limit occurrences of the inventory carrier 110 from tipping over. Each guide 160 can be rotationally fixed relative to its inventory carrier 110. Further, each wheel assembly 126 or 128 can be configured to rotate relative to its respective guide 160. Thus, as each wheel assembly 126 or 128 of an inventory carrier 110 rotates to maintain its wheels in contact with the outer and inner guiderail surfaces 134 and 136, the respective guide 160 remains rotationally fixed relative to the inventory carrier 110 to maintain the inventory carrier 110 fixed in the upright position.

Referring again to FIGS. 1 to 5, the inventory carriers 110 along the upper and lower tracks 112 and 114 can be densely packed. For example, each inventory carrier 110 on the upper track 112 can be spaced from an inventory carrier on the lower track 114 by a distance that provides a clearance between the inventory containers as described above. The storage module 100 can be elongate along the longitudinal direction L. For instance, the storage module 100 have an overall module length $L_M$ along the longitudinal direction L, an overall module height $H_M$ along the vertical direction V, and an overall module width $W_M$ along the lateral direction A. The overall module length $L_M$ can be greater than the overall module height $H_M$ and the overall module width $W_M$. Further, in some embodiments, the overall module width $W_M$ can be greater than the overall module height $H_M$.

As described above, the storage module 100 has at least one motor 130 and at least one drivetrain 132 that drives the inventory carriers 110 to translate around the first and second guiderails 102 and 104. For example, the storage module 100 can have a motor 130 that drives a drivetrain 132 that is adjacent to the first guiderail 102 at the first end 106. As another example, the storage module 100 can have a motor 130 that drives a drivetrain 132 that is adjacent the first guiderail 102 at the second end 108. As yet another example, the storage module 100 can have a motor 130 that drives a drivetrain 132 that is adjacent the second guiderail 104 at the first end 106. As yet still another example, the storage module 100 can have a motor 130 that drives a drivetrain 132 that is adjacent the second guiderail 104 at the second end 108.

In an alternative embodiment, the storage module 100 can have a motor that drives both the drivetrains 132 at the first end 106, and the storage module 100 can have a motor that drives both the drivetrains 132 at the second end 108. For example, the drivetrains 132 adjacent the first and second guiderails 102 and 104 at the first end 106 can share a common axle that is driven by one motor 130, and the drivetrains 132 adjacent the first and second guiderails 102 and 104 at the second end 108 can share a common axle that is driven by one motor 130. In another alternative embodiment, the storage module 100 can have a first motor 130 and drivetrain 132 that drives an entirety of the first guiderail 102 and a second motor 130 and drivetrain 132 that drives an entirety of the second guiderail 104. For example, each drivetrain 132 can extend along the length of a respective one of the first and second guiderails 102 and 104. In yet another alternative embodiment, the storage module 100 can have one motor 130 and a pair of drivetrains 132 that drive an entirety of both the first and second guiderails 102 and 104. For example, the pair of drivetrains 132 can share a common axle that is driven by one motor 130, and each drivetrain 132 can extend along the length of a respective one of the first and second guiderails 102 and 104.

The at least one motor 130 and at least one drivetrain 132 can be configured to drive the inventory carriers 110 to translate along the upper and lower tracks 112 and 114 at a first speed. Further, the at least one motor 130 and drivetrain 132 can be configured to drive the inventory carriers 110 to translate along one of the first and second connecting tracks 116 and 118 at a second speed, faster than the first speed, when each inventory carrier 110 transitions between the upper track 112 and the lower track 114. As such, when a transitioning inventory carrier 110 translates along one of the first and second connecting tracks 116 and 118, the transitioning inventory carrier 110 accelerates away from a following inventory carrier 110, which is translating at the first speed, to increase spacing between the transitioning inventory carrier 110 and the subsequent inventory carrier 110. Further, the transitioning inventory carrier 110 accelerates towards a preceding inventory carrier 110, which is translating at the first speed, so as to catch up to the preceding inventory carrier 110. Thus, the density of the inventory carriers 110 can be smaller at the first and second connecting tracks 116 and 118 than that of the upper and lower tracks 112 and 114 so as to provide sufficient space around the first and second connecting tracks 116 and 118 for each transitioning inventory carrier 110 to separate from a subsequent inventory carrier 110. Accelerating each transitioning inventory carrier 110 in such a manner can prevent the transitioning inventory carrier 110 from colliding with the following and preceding inventory carriers 110 as the transitioning inventory carrier 110 translates along one of the first and second connecting tracks 116 and 118.

Each drivetrain 132 comprises a lower-speed pulley or gear system 166 and a higher-speed pulley or gear system 168. The lower-speed system 166 is configured to drive the inventory carriers 110 along a respective one of the upper and lower tracks 112 and 114 at the first speed and to a respective one of the connecting tracks 116 and 118. Further, the lower-speed system 166 is configured to drive the inventory carriers 110 away from the respective one of the connecting tracks 116 and 118 at the first speed and along the other one of the upper and lower tracks 112 and 114. In this regard, the low-speed system pushes a carrier 110, which pushes all the containers 10 in front of it. The higher-speed system 168 is configured to drive the inventory carriers 110 along a respective one of the connecting tracks 116 and 118 to the other one of the upper and lower tracks 112 and 114 at the second speed, which is faster than the first speed as stated above. Thus, the higher-speed system 168 is configured to drive each inventory carrier 110 to separate from the slower moving inventory carriers 110 on the respective one of the upper and lower tracks 112 and 114 and to catch up to the slower moving inventory carriers 110 on the other one of the upper and lower tracks 112 and 114.

Each higher-speed system 168 is disposed at a respective one of the first and second connecting tracks 116 or 118. For example, each higher-speed system 168 can extend from one of the first and second ends 106 and 108 towards the other of the first and second ends 106 and 108. Each higher-speed system 168 can include a pulley or gear system configured to engage each inventory carrier 110 as it approaches a respective one of the first and second connecting tracks 116 or 118 and drive the inventory carrier 110 from the respective upper track 112 to the respective lower track 114. For example, each higher-speed system 168 can include a first pulley or gear 170 proximate to one of the first and second ends 106 and 108, and a second pulley or gear 172 that is spaced from the first pulley or gear 170 along the longitudinal direction L towards the other one of the first and second ends 106 and 108. The higher-speed system 168 can further include a chain or belt 174 that loops around the first and second pulleys or gears 170 and 172. As each inventory carrier 110 approaches the higher-speed system 168, the chain or belt 174 engages the inner wheel 154 of the inventory carrier 110 such that the chain or belt 174 and the inner wheel 154 are translationally fixed to one another. Thus, translation of the chain or belt 174 around the first pulley or gear 170 and the second pulley or gear 172 causes the inner wheel 154, and consequently the inventory carrier 110, to translate with the chain or belt 174.

Each lower-speed system 166 can extend from a respective one of the higher-speed systems 168 at one of the first and second ends 106 and 108 towards the other one of the first and second ends 106 and 108. In some examples, each lower-speed system 166 extends only part of the way towards the other one of the first and second ends 106 and 108 such that the lower-speed system 166 is configured to drive only one or a few of the inventory carriers 110 at a time. The inventory carriers 110 driven by the lower-speed portion 166 then push the preceding inventory carriers 110 towards the other of the first and second ends 106 and 108. In some embodiments, the lower-speed portion 166 can terminate before a midpoint of respective guiderail 102 or 104 along the longitudinal direction L. In alternative embodiments, each guiderail 102 and 104 can have a single lower-speed portion 166 that extends from a higher-speed portion 168 at its first end 106 to the higher-speed portion 168 at its second end 108 such that all inventory carriers 110 between the higher-speed portions 168 are driven by the lower-speed portion 166.

Each lower-speed system 166 can include a pulley or gear system configured to engage inventory carriers 110 at the ends of a respective upper track 112 and a respective lower track 114. For example, each lower-speed system 166 can include a first pulley or gear 180 proximate to a respective higher-speed system 168 at one of the first and second ends 106 and 108, and a second pulley or gear 182 that is spaced from the first pulley or gear 180 along the longitudinal direction L towards the other one of the first and second ends 106 and 108. The lower-speed system 166 can further include a lower-speed chain or belt 184 that loops around the first and second pulleys or gears 180 and 182. As each inventory carrier 110 approaches the lower-speed system 166, the lower-speed chain or belt 184 engages the inner wheel 154 of the inventory carrier 110 such that the lower-speed chain or belt 184 and the inner wheel 154 are translationally fixed to one another. Thus, translation of the lower-speed chain or belt 184 around the first pulley or gear 180 and the second pulley or gear 182 causes the inner wheel 154, and consequently the inventory carrier 110, to translate with the lower-speed chain or belt 184.

Each drivetrain 132 can include a speed changing system 186. The speed changing system 186 can be coupled to both the lower-speed system 166 and the higher-speed system 168. The speed changing system 186 can be driven by one of the higher-speed system 168 and the lower-speed system 166 at one speed, and can resultantly drive the other one of the higher-speed system 168 and the lower-speed system 166 at another speed. In one embodiment, and as shown, the speed changing system 186 can be a speed reduction system that is driven by the higher-speed system 168 at the second speed, and that drives the lower-speed system 166 at the first speed, lower than the second speed. In alternative embodiments, the speed changing system 186 can be a speed increasing system that is driven by the lower-speed system 166 at the first speed, and that drives the higher-speed system 168 at the second speed, faster than the first speed.

The speed changing system 186 can include a smaller pulley or gear 188 and a larger pulley or gear 190. The smaller pulley or gear 188 can have a diameter that is smaller than the larger pulley or gear 190. The smaller pulley or gear 188 can be coaxial with, and rotationally fixed with respect to, the second pulley or gear 172 of the higher-speed system 168 such that the smaller pulley or gear 188 rotates at the same rate as the second pulley or gear 172. Further, the larger pulley or gear 190 can be coaxial with, and rotationally fixed with respect to, the first pulley or gear 180 of the lower-speed system 166 such that the first pulley or gear 180 rotates at the same rate as the larger pulley or gear 190.

The smaller pulley or gear 188 can be coupled to the larger pulley or gear 190 such that one of the smaller pulley or gear 188 and the larger pulley or gear 190 drives the other one of the smaller pulley or gear 188 and the larger pulley or gear 190. The speed changing system 186 can be configured such that the smaller pulley or gear 188 completes more than one full rotation for each full rotation of the larger pulley or gear 190. The speed changing system 186 can include a driving chain or belt 192 that loops around both the smaller pulley or gear 188 and the larger pulley or gear 190. In an alternative embodiment (not shown), an outer surface or teeth of the smaller pulley or gear 188 can engage an outer surface or teeth of the larger pulley or gear 190.

In one embodiment (as shown), rotation of the second pulley or gear 172 of the higher-speed system 168 can cause the smaller pulley or gear 188 to correspondingly rotate at the second speed. Further, rotation of the smaller pulley or gear 188 can cause the larger pulley or gear 190 to rotate at the first speed, thereby causing the first pulley or gear 180 of the lower-speed system 166 to correspondingly rotate at the first speed. In an alternative embodiment (not shown), rotation of the first pulley or gear 180 of the lower-speed system 166 cause the larger pulley or gear 190 to correspondingly rotate at the first speed. Further, rotation of the larger pulley or gear 190 can cause the smaller pulley or gear 188 to rotate at the second speed, thereby causing the second pulley or gear 172 of the higher-speed system 168 to correspondingly rotate at the second speed. In yet another alternative embodiment (not shown), each guiderail 102 and 104 can have a single motor 130 and a single drivetrain 130 or both guiderails 102 and 104 can be driven by the same motor 130. For example, the lower-speed system 166 can extend from the higher-speed system 168 at the first end 106 to the higher-speed system 168 at the second end 108. Thus, the higher-speed system 168 at the first end 106 can drive the lower-speed system 166, which can in turn drive the higher-speed system 168 at the second end 108.

As described above, each drivetrain 132 can be driven by at least one motor 130. The at least one motor 130 can drive one of the lower-speed system 166 and the higher-speed system 168, which can in turn drive the other one of the lower-speed system 166 and the higher-speed system 168. For example, in one embodiment (as shown), the at least one motor 130 can drive the higher-speed system 168, which can in turn drive the lower-speed system 166. In an alternative embodiment (as shown), the at least one motor 130 can drive the lower-speed system 166, which can in turn drive the higher-speed system 168. Further, in another alternative embodiment (not shown), each of the lower-speed system 166 and the higher-speed system 168 can be driven individually by its own motor 130, in which case the speed changing system 186 can be eliminated.

Each motor 130 can be uni-directional so as to drive the inventory carriers 110 in a first direction around the loop of the respective guiderail 102 or 104, or can be bidirectional so as to selectively drive the inventory carriers 110 in the first direction or a second direction, opposite the first direction. Each motor 130 can act indirectly on its respective higher-speed system 168 or lower-speed system 166. For example, as shown, each motor 130 can be outwardly spaced from its respective guiderail 102 or 104 and can be coupled to the higher-speed system 168 by a drive chain or belt. In some embodiments, the motor 130 can be spaced from its respective guiderail 102 or 104 with respect to the longitudinal direction L. Outwardly spacing the motor 130 from its respective guiderail 102 or 104 can enable the motor 130 to be accessible for repair, replacement, or general maintenance. The motor 130 can act indirectly on one of the first pulley or gear 170 and the second pulley or gear 172. For example, each drivetrain 132 can include a driving pulley or gear 176 and a driving chain or belt 178 that loops around the driving pulley or gear 176 and a rotating axle 131 of the motor 130. The driving pulley or gear 176 can be coaxial with, and rotationally fixed with respect to, the first pulley or gear 170 as shown. Thus, rotation of the motor axle 131 by the motor 130 causes the drive chain or belt to rotate, which causes the driving pulley or gear 176 to rotate, which in turn causes the first pulley or gear 170 to rotate.

In an alternative embodiment (not shown), the driving pulley or gear 176 can be coaxial with, and rotationally fixed with respect to, the second pulley or gear 172. Thus, rotation of the motor axle 131 by the motor 130 can cause the drive chain or belt to rotate, which can cause the driving pulley or gear 176 to rotate, which in turn can cause the second pulley or gear 172 to rotate. In yet another alternative embodiment (not shown), the motor 130 can act directly on one of the first pulley or gear 170 and the second pulley or gear 172. For example, the motor 130 and drivetrain 132 can be configured such that the axle of the one of the first pulley or gear 170 and the second pulley or gear 172 is the rotational axle 131 of the motor 130. Thus, rotation of the motor axle 131 can directly rotate the one of the first pulley or gear 170 and the second pulley or gear 172 without a driving chain or belt connected between the motor 130 and the one of the first pulley or gear 170 and the second pulley or gear 172. In yet still another alternative embodiment (not shown), the motor 130 can act indirectly on one of the first pulley or gear 180 and the second pulley or gear 182 of the lower-speed system 166 in a manner similar to that described above with respect to the higher-speed system 168.

The storage module 100 can include at least one controller 194 configured to provide a control signal to the at least one motor 130 so as to control the operation of the at least one motor 130. In some embodiments, the controller 194 can control the speed in which the axle 131 is rotated. Further, in some embodiments, the controller 194 can control the direction in which the axle 131 is rotated, and hence the direction in which the inventory carriers 110 are translated. Yet further, in some embodiments, the controller 194 can stop the at least one motor 130 when a desired one of the inventory carriers 110 is presented at one of the first end 106 and the second end 108.

Figure 6:
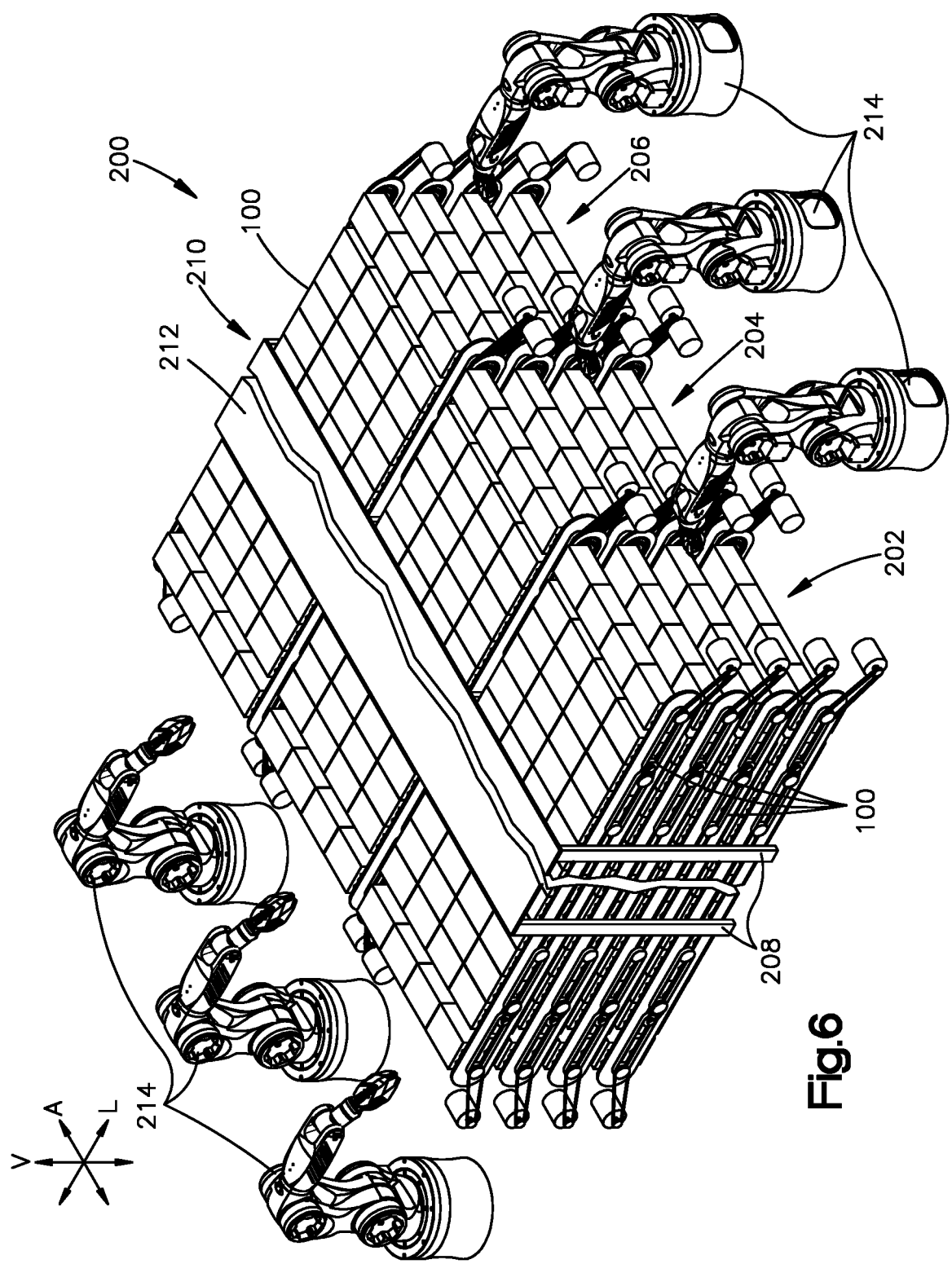
FIG. 6 shows a perspective view of a storage system comprising a plurality of the storage modules of FIG. 1.

Turning now to FIG. 6, a modular storage and retrieval system 200 is shown that comprises a plurality of instances of the storage module 100 of FIG. 1. The system 200 includes a first vertical stack 202 of the storage modules 100 that comprises a plurality (e.g., 4) of the storage modules 100 stacked on top of one another along the vertical direction V. The system 200 can further include a second vertical stack 204 of the storage modules 100 that comprises a plurality (e.g., 4) of the storage modules 100 stacked on top of one another along the vertical direction V. The second vertical stack 204 can be offset from the first vertical stack 202 along the lateral direction A. The storage system 200 can yet further include a third vertical stack 206 of the storage modules 100 that comprises a plurality (e.g., 4) of the storage modules 100 stacked on top of one another along the vertical direction V. The third vertical stack 206 can be offset from the second vertical stack 204 along the lateral direction A such that the second vertical stack 204 is between the first and third vertical stacks 202 and 206. Each storage module 100 of the system 200 can be independently operated such that the inventory carriers 110 of each storage module 100 can be driven around their corresponding loop independently of the inventory carriers 110 of other storage module 100 being driven around their corresponding loop. Although three vertical stacks 202, 204, and 206, each having four storage modules 100 are shown, it will be understood that the number of vertical stacks and storage modules 100 in each vertical stack can vary from that shown. In particular, modular storage and retrieval systems of the disclosure can include at least one vertical stack of storage modules 100 or more than one vertical stack of storage modules 100. Further, each vertical stack of storage modules 100 can have at least two storage modules 100 stacked on top of one another or more than two storage modules 100. Thus, height, width, and length of the system 200 can be scalable to fit within a desired volume in a warehouse space.

The modular storage and retrieval storage system 200 can include supports 208 that are coupled to the storage modules 100 in each vertical stack 202, 204, and 206 so as to maintain the storage modules 100 in a stacked relation. The supports 208 can further be coupled to the storage modules 100 so as to attach the vertical stacks 202, 204, and 206 of storage modules 100 to one another. The supports 208 can combine to form a frame 210 of the system 200. The system 200 can further include a platform 212 that extends across the top of the vertical stacks 202, 204, and 206 of storage modules 100. The platform 212 can be coupled to the supports 208. Further, the platform 212 can be used for maintenance and inspection of the modular storage and retrieval system 200.

The modular storage and retrieval system 200 can also include at least one robotic manipulator 214. For example, the system 200 can include at least one robotic manipulator 214 that services the first end 106 of each vertical stack of storage modules 100 as shown. The system 200 can also include at least one robotic manipulator 214 that services the second end 108 of each vertical stack of storage modules 100 as shown. In some embodiments, the manipulators 214 at the first end 106 can be used to stow inventory items in the storage modules 100, and the manipulators 214 at the second end 108 can be used to retrieve inventory items from the storage modules 100. Alternative embodiments can include at least manipulator 214 on only one end 106 of a vertical stack, the at least one manipulator 214 configured to perform both stowing and retrieving operations. Additionally or alternatively, one or more of the robotic manipulators 214 can service multiple vertical stacks of storage modules 100. Although not shown, in some embodiments, the at least one robotic manipulator 214 can be configured to move vertically and/or horizontally to service the storage modules 100 of the system 200. For example, a robotic manipulator 214 can be mounted on a horizontal and/or vertical track to enable it to move with respect to the vertical stacks.

Each robotic manipulator 214 can be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). Each robotic manipulator 214 cam include any suitable type and number of sensors disposed throughout the robotic manipulator 214 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 214, including an end effector. The sensors can be in communication with a controller 216. The controller 216 can be local to the robotic manipulator 214 (e.g., a robotic manipulator controller) or can be separate from, but in communication with, the robotic manipulator 214. In this manner, the controller 216 can control the operation of the robotic manipulator 214 and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

Other material conveyance devices (not shown) may also be disposed adjacent to the robotic manipulators 214. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices can be used to transport inventory items and/or storage containers to and from the robotic manipulators 214.

Figure 7:
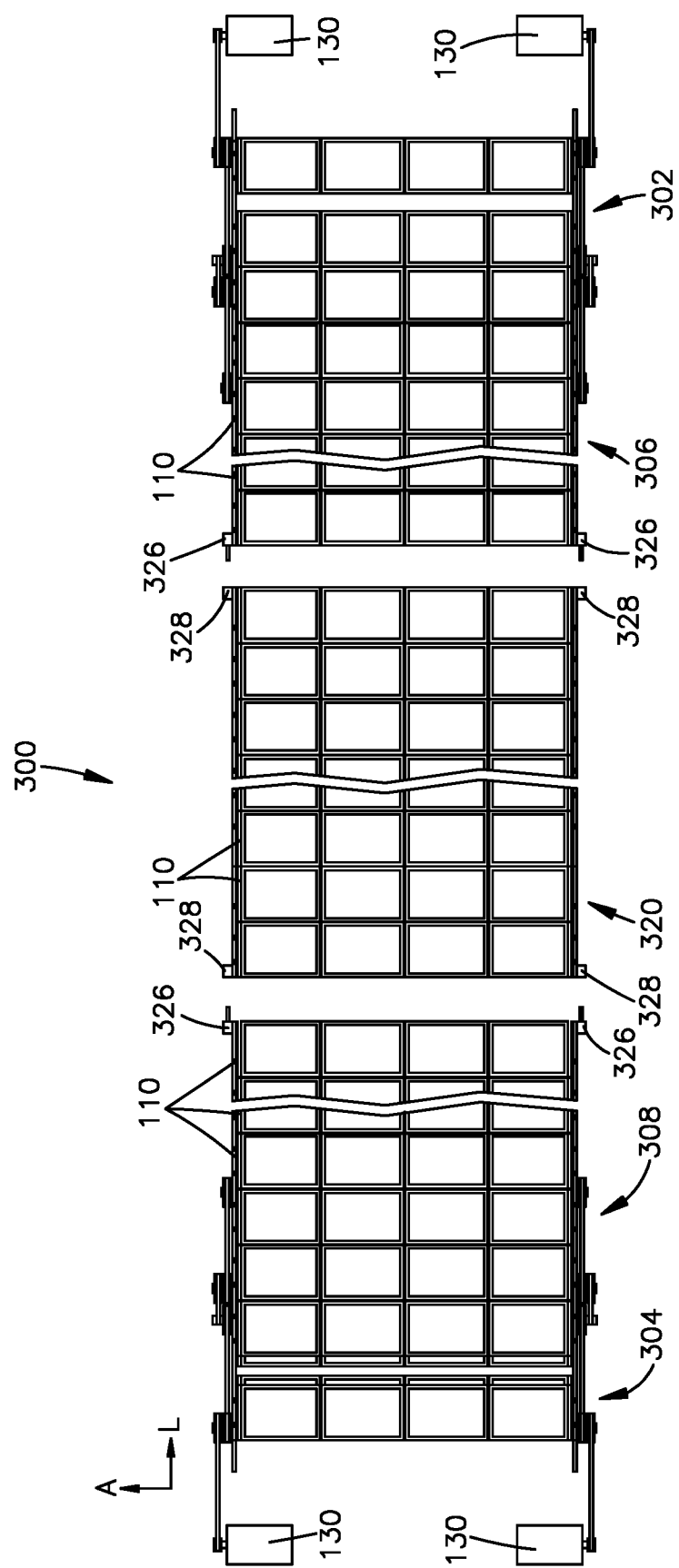
FIG. 7 shows an exploded top plan view of a storage system according to one embodiment.
Figure 8:
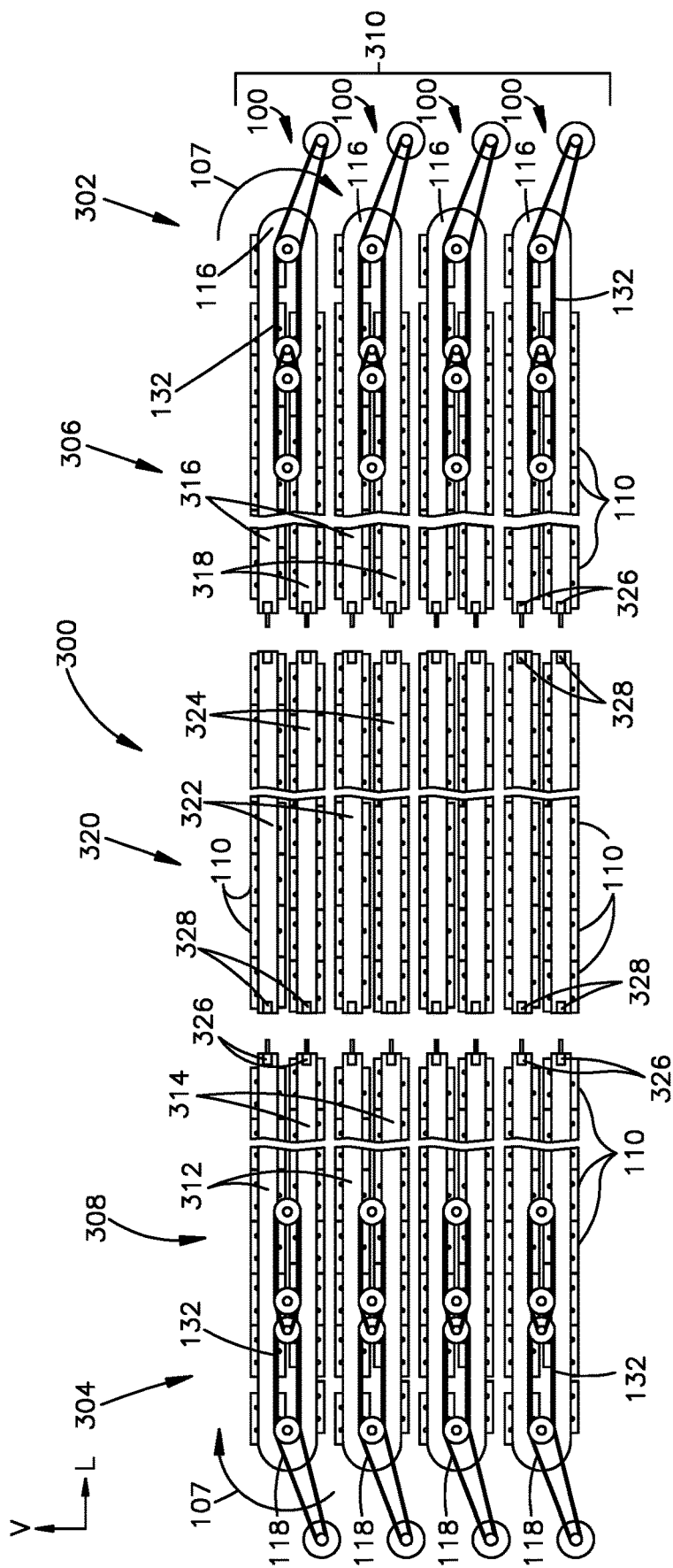
FIG. 8 shows an exploded side elevation view of the storage system of FIG. 7.

Turning now to FIGS. 7 and 8, a modular storage and retrieval system 300 is shown according to one embodiment that is configured to be transported by truck or intermodal storage container and assembled upon delivery. The system 300 can be implemented as described above in relations to FIGS. 1-6. Further, the system 300 can be divided into at least a first end section 306 and a second end section 308, each of which can be transported individually in a truck or intermodal shipping container. In some embodiments, the system 300 can also include at least one intermediate section 320 that can be transported individually in a truck or intermodal shipping container. For example, in one embodiment, each section 306, 308, and 320 can have a length of 50 feet, for an overall system length of 150 feet. The number of intermediate sections 320 can be dependent upon the overall length of the system 300. For example, longer systems 300 can have more intermediate sections 320 than smaller systems 300. Thus, the length of system 300 can be scalable by adding further intermediate sections 320.

The storage system 300 comprises at least one vertical stack 310 of the storage modules 100. In some embodiments, the system 300 can comprise a plurality of vertical stacks 310. The height of system 300 can be scalable by adding additional instances of the vertical stack 310 on top of one another. Additionally, the width of system 300 can be scalable by adding additional instances of the vertical stack 310 next to one another in a manner similar to that shown in FIG. 6. Each instance of the vertical stack 310 can have first and second end sections similar to first and second end sections 306 and 308, and can optionally include one or more intermediate sections 320. The sections (e.g., 306, 308, and 320) of each instance of the vertical stack 310 can be transported separately to a destination, and then assembled together at the destination. Assembling the system 300 in this manner can reduce startup time for the system 300 as compared to transporting and assembling each component of each storage module 100 individually.

The vertical stack 310 has a first stack end 302 and a second stack end 304 that are spaced from one another along the longitudinal direction L. The storage modules 100 are stacked on top of one another along the vertical direction V. Each storage module 100 defines a path that forms a loop 107 in a plane that extends in the longitudinal direction L and vertical direction V, and each storage module 100 has a plurality of inventory carriers 110 that translate around the loop 107 as discussed above.

The first end section 306 extends from the first stack end 302 towards the second stack end 304, and terminates before the second stack end 304, such that the first end section 306 includes a first end of each loop 107 of the vertical stack 310. Similarly, the second end section 308 extends from the second stack end 304 towards the first stack end 302, and terminates before the first stack end 302, such that the second end section 308 includes a second end of each loop 107 of the vertical stack 310. At least one, such as both, of the first and second end sections 306 and 308 includes a drivetrain 132 configured to drive inventory carriers 110 around the loop 107. Each drivetrain 132 can be configured as discussed above.

The first and second end sections 306 and 308 are coupleable to one another. In some embodiments, the first and second end sections 306 and 308 are removeably coupleable to one another, meaning that the sections 306 and 308 can be separated from one another without damaging the sections. For example, the first end section 304 can include the first connecting track 116 of each storage module 100, a first upper track section 312 of each upper track 112 that extends from the first connecting track 116, and a first lower track section 314 of each lower track 114 that extends from the first connecting track 116. The second end section 308 can include the second connecting track 118 of each storage module 100, a second upper track section 316 of each upper track 112 that extends from the second connecting track 118, and a second lower track section 318 of each lower track that 114 that extends from the second connecting track 118.

The first and second end sections 306 and 308 are coupleable to one another such that each first upper track section 312 is coupled to a corresponding one of the second upper track sections 316 and each first lower track section 314 is coupled to a corresponding one of the second lower track sections 318. The first and second end sections 306 and 306 are individually sized to be transported in a truck or intermodal storage container. For example, each end section The intermediate section 320 extends between the first and second end sections 306 and 308. The intermediate section 320 includes an intermediate portion of each loop 107. In some embodiments, the intermediate section 320 can be devoid of a drivetrain that drives the inventory carriers 110 as shown. The intermediate section 320 includes an intermediate upper track section 322 of each upper track 112 and an intermediate lower track section of 324 each lower track 114. The intermediate section 320 is coupleable to both the first and second end sections 306 and 308 such that each intermediate upper track section 322 couples corresponding first and second upper track sections 312 and 316 to one another and each intermediate lower track section 324 couples corresponding first and second lower track 314 and 318 sections to one another. Thus, a first end of the intermediate section 320 is coupleable to the first end section 306 and a second end of the intermediate section 320 is coupleable to the second end section 308 so as to couple the first end section 306 to the second end section 308. In some embodiments, the first and second end sections 306 and 308 are removeably coupleable to one another such that the sections 306, 308, and 320 can be separated from one another without damaging the sections.

The storage system 300 comprises a plurality of couplers 326 and 328 configured to couple the first and second end sections 306 and 308 to one another. For example, the first upper and lower track sections 312 and 314 can each include a coupler 326 configured to couple to a coupler 328 of a corresponding intermediate upper or intermediate lower track section 322 or 324. Similarly, the second upper and lower track sections 316 and 318 can each include a coupler 326 configured to couple to a coupler 328 of a corresponding intermediate upper or intermediate lower track section 322 or 324.

In operation, the first end section 306 of the vertical stack 310 of storage modules 100 can be transported and received by truck or intermodal storage container. The second end section 308 of the vertical stack 310 can be separately received by truck or intermodal storage container. The intermediate section or sections 320 (if present) can also be separately received by truck or intermodal storage container. Once received, the first and second end sections 306 and 308 can be coupled to one another so as to assemble the vertical stack 310. For example, the first and second end sections 306 and 308 can be coupled to one another via one or more intermediate sections 320 or can be directly coupled to one another without an intermediate section 320 therebetween.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A storage module configured to store inventory items, the storage module comprising:
   a first end and a second end spaced from one another along a longitudinal direction;
   first and second guiderails that are spaced from one another along a lateral direction, each guiderail having an upper track and a lower track spaced from one another along a vertical direction, and first and second connecting tracks that connect the upper track to the lower track at the first and second ends, respectively;

a plurality of inventory carriers that are supported between the first and second guiderails, are arranged end-to-end along the upper and lower tracks, and are configured to carry a plurality of inventory items, each inventory carrier having first and second sides spaced from one another along the lateral direction, and each inventory carrier having a first wheel assembly at the first side that couples the inventory carrier to the first guiderail, and a second wheel assembly at the second side that couples the inventory carrier to the second guiderail;

at least one motor; and at least one drivetrain that is driven by the at least one motor, the at least one drivetrain configured to drive the inventory carriers to translate along the upper tracks and the lower tracks at a first speed while driving inventory carriers to translate along one or both of the first and second connecting tracks at a second speed, faster than the first speed so as to limit contact between the inventory carriers as each inventory carrier transitions between the upper tracks and the lower tracks;

wherein the storage module is configured to translate the inventory carriers along the upper tracks, the lower tracks, and the first and second connecting tracks until a desired inventory carrier is presented at one of the first and second ends, at which position the desired inventory carrier can be accessed.

2. The storage module of claim 1, wherein the drivetrain comprises a lower-speed pulley or gear system configured to drive the inventory carriers along the upper and lower tracks of a respective one of the first and second guiderails at the first speed, and comprises a higher-speed pulley or gear system configured to drive the inventory carriers along one or both of the first and second connecting tracks of a respective one of the first and second guiderails at the second speed.

3. The storage module of claim 2, wherein the higher-speed pulley or gear system is configured to drive each inventory carrier to separate from a following inventory carrier on one of the upper and lower tracks of a respective one of the first and second guide rails, and to catch up to a preceding inventory carrier on the other one of the upper and lower tracks of the respective one of the first and second guide rails.

4. An inventory storage module, comprising:

a first end and a second end spaced from one another along a longitudinal direction;

first and second guiderails that are spaced from one another along a lateral direction, each guiderail having an upper track and a lower track spaced from one another along a vertical direction, and first and second connecting tracks that connect the upper track to the lower track at the first and second ends, respectively;

a plurality of inventory carriers that are supported between the first and second guiderails, are arranged end-to-end along the upper and lower tracks, and are configured to carry a plurality of inventory items; and at least one motor and drivetrain configured to drive the inventory carriers to translate along the upper tracks and the lower tracks at a first speed while driving inventory carriers to translate along one or both of the first and second connecting tracks at a second speed, faster than the first speed, when the inventory carriers transition between the upper tracks and the lower tracks.

5. The storage module of claim 4, wherein the drivetrain comprises a lower-speed pulley or gear system configured to drive the inventory carriers along the upper and lower tracks of a respective one of the first and second guiderails at the first speed, and comprises a higher-speed pulley or gear system configured to drive the inventory carriers along one or both of the first and second connecting tracks of a respective one of the first and second guiderails at the second speed.

6. The storage module of claim 5, wherein the higher-speed pulley or gear system is configured to drive each inventory carrier to separate from a following inventory carrier on one of the upper and lower tracks of a respective one of the first and second guide rails, and to catch up to a preceding inventory carrier on the other one of the upper and lower tracks of the respective one of the first and second guide rails.

7. The storage module of claim 5, wherein the higher-speed pulley or gear system extends from one of the first and second ends towards the other one of the first and second ends, and the lower-speed system extends from the higher-speed system towards the other one of the first and second ends.

8. The storage module of claim 7, wherein the lower-speed pulley or gear system includes a first pulley or gear, a second pulley or gear that is spaced from the first pulley or gear along the longitudinal direction, and a chain or belt that loops around the first and second pulleys or gears, the chain or belt configured to engage a wheel of each inventory carrier so as to drive each inventory carrier at the first speed.

9. The storage module of claim 7, wherein the higher-speed pulley or gear system includes a first pulley or gear, a second pulley or gear that is spaced from the first pulley or gear along the longitudinal direction, and a chain or belt that loops around the first and second pulleys or gears, the chain or belt configured to engage a wheel of each inventory carrier so as to drive each inventory carrier at the second speed.

10. The storage module of claim 4, wherein each inventory carrier has a first carrier side and a second carrier side spaced from the first carrier side along the lateral direction, and the storage module has, for each inventory carrier, a first wheel assembly that is configured to couple the first carrier side of the inventory carrier to the first guiderail, and a second wheel assembly that is configured to couple the second carrier side of the inventory carrier to the second guiderail.

11. The storage module of claim 4, wherein each respective guiderail of the first and second guiderails has an outer guiderail surface that defines an outer perimeter of the respective guiderail and an inner guiderail surface that defines an inner perimeter of the respective guiderail.

12. The storage module of claim 11, wherein the inner guiderail surface is spaced inward of the outer guiderail surface such that the outer guiderail surface surrounds the inner guiderail surface.

13. The storage module of claim 11, wherein each inventory carrier comprises first and second wheel assemblies, each including an inner wheel configured to translate along the inner guiderail surface and an outer wheel configured to translate along the outer guiderail surface.

14. The storage module of claim 4, wherein each inventory carrier is elongate along the lateral direction, and is configured to carry a plurality of storage containers that are arranged side-by-side along the lateral direction.

15. The storage module of claim 4, wherein the motor is spaced outwardly from the first and second guiderails with respect to the longitudinal direction.

16. The storage module of claim 4, comprising a controller configured to provide a control signal to the at least one motor so as to stop the at least one motor when a desired one of the inventory carriers is presented at one of the first and second ends.

17. A storage system, comprising a plurality of instances of the storage module of claim 4 stacked on top of one another along the vertical direction.

* * * * *